March 29, 1955 E. E. ELLISTON 2,705,060
BRAKING MECHANISMS FOR FISHING REELS
Filed March 13, 1952
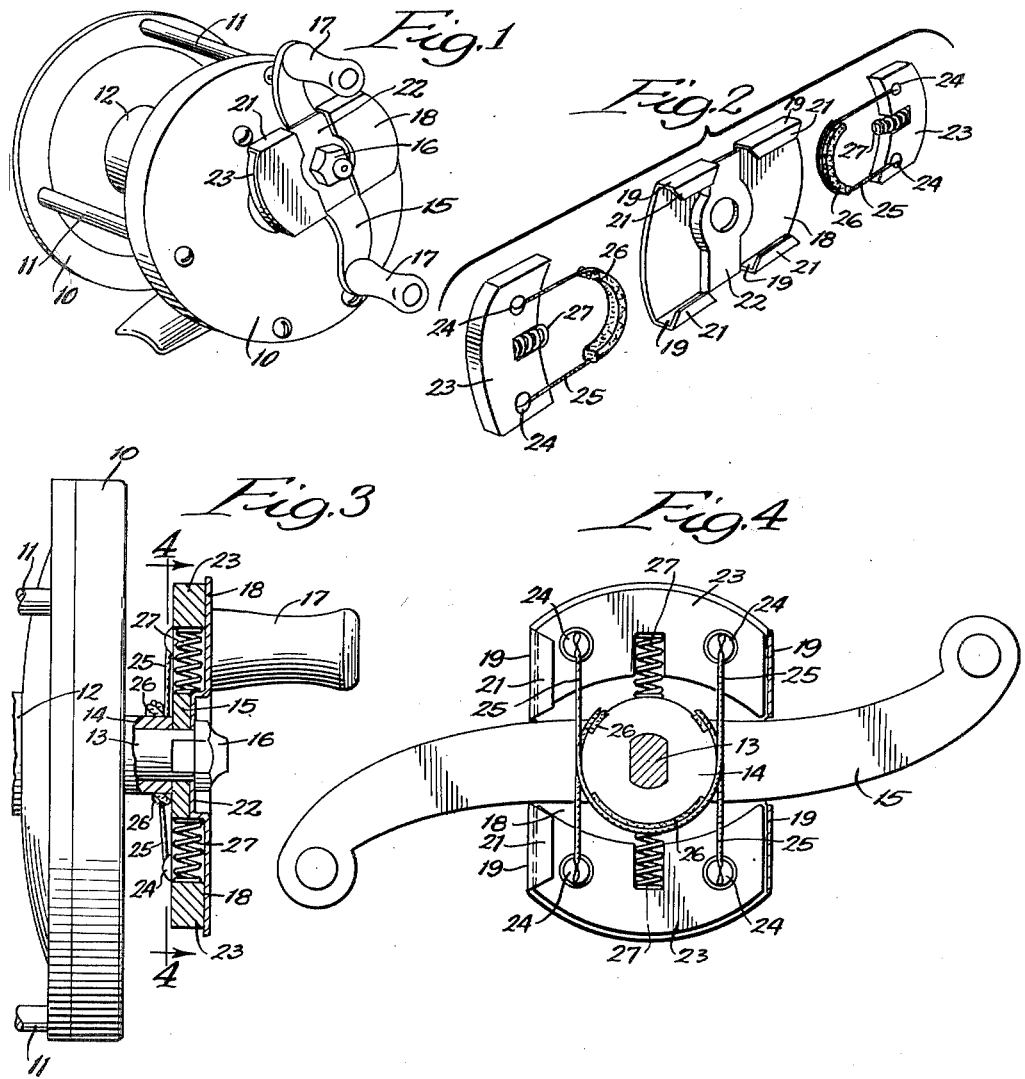
INVENTOR:
Edward E. Elliston,
BY
E. S. Booth,
ATTORNEY.

2,705,060

Patented Mar. 29, 1955

2,705,060

BRAKING MECHANISMS FOR FISHING REELS

Edward E. Elliston, Chicago, Ill., assignor of one-half to Edith K. Weinstein, Highland Park, and one-half to Leroy A. Kling, Evanston, Ill.

Application March 13, 1952, Serial No. 276,288

4 Claims. (Cl. 188—186)

This invention relates to braking mechanisms for fishing reels, and more particularly to a speed responsive braking mechanism or governor for attachment to existing reels.

Many types of devices have been provided to prevent back lash during casting with fishing reels. The most successful of these are devices which apply a drag or braking action on the reel which is proportional to the speed of the reel. Such devices tend to keep tension on the line during the maximum velocity portion of the cast when back lashes are most apt to occur and exert minimum drag at lower reel speeds. They therefore interfere to the minimum extent with freedom of running of the reel so that the casts obtainable are not shortened. When braking devices of this type are built into a reel they complicate the construction and increase the reel cast materially. Attachments have been proposed to produce the desired braking action but as heretofore constructed these have also been relatively complicated and expensive.

It is an object of the present invention to provide a braking mechanism for fishing reels which is simple and inexpensive to manufacture, which is easy to mount on existing reels, and which functions to produce the desired braking action in response to the reel speed.

Another object is to provide a braking mechanism which can be mounted on and dismounted on reels without requiring any change in the reel itself, and without the use of separate fastening means.

According to one feature of the invention the mechanism is mounted entirely on the handle of the reel to rotate therewith and is provided with braking loops to loop over and frictionally engage the fixed hub on the reel through which the handle shaft extends.

A further object is to provide a braking mechanism in which a flexible wire loop is attached to a weight member in an extremely simple and inexpensive manner.

The above and other objects of the invention may be more clearly seen by reference to the attached drawing, in which:

Figure 1 is a perspective view of a reel equipped with a braking mechanism embodying the invention;

Figure 2 is a disassembled perspective view of the braking mechanism;

Figure 3 is a sectional view illustrating the mounting of the braking mechanism on the reel, and Figure 4 is a section on the line 4—4 of Figure 3 with the reel shaft and hub omitted.

The braking mechanism of the invention can be applied to any conventional casting reel of which the reel shown in Figure 1 is representative. Such reels normally include end plates 10 connected by cross bars 11 and with a rotatable spool 12 mounted between the end plates and within the cross bars to receive a line. The spool is connected through gearing in one of the end plates 10 to a handle shaft 13 which extends from the end plate through a short hub 14 fixed to the end plate. The handle shaft carries a handle including a flat bar 15 formed with a non-circular central opening to fit over a flattened end portion on the shaft 13, and which is secured on the shaft by means of a bolt 16 threaded into the end of the shaft. At its outer ends the handle bar 15 rotatably carries a pair of handles 17 which can be gripped by the user to wind the line on the spool.

The braking mechanism of the present invention is adapted to be carried entirely by the handle to engage the hub 14 frictionally thereby to resist rotation of the spool 12 at high speed. The mechanism as shown comprises a guide member 18 which is generally channel shaped with a flat web portion and with flanges 19 extending at right angles therefrom and turned inward at their inner ends at 21. The flanges 19 are cut away in the central part of the web 18 and the web is preferably pressed inward as indicated at 22 to fit against the outer surface of the handle. The inwardly pressed portion 22 of the web provides a raised seat to seat against the handle thereby to hold the guide member spaced away from the end plate 10 in the case of reels in which the hub 14 is short.

The guide member receives a pair of weights 23 which are preferably flat metal members having curved edges as shown, and which are of a size to fit between the flanges 19 with the inturned edges 21 extending slightly over their faces. In this way the weights 23 are held in the guide member for free sliding movement therein.

Each of the weights is formed with holes therein near its ends to receive rivets 24 of relatively soft material, such as brass. The rivets 24 extend through the holes in the plates and have their ends which project beyond the plates slotted to receive the ends of wire loops 25. The loops 25 are preferably formed of a flexible wire, such as a fine twisted cable or the like, and are of a length to extend around the hub when the braking mechanism is assembled on the reel. To secure the loops to the weights the ends of the loops are fitted into the grooves in the rivets 24 which are then upset to secure the rivets in place in the weights and to grip the wire tightly. At their central parts the loops preferably carry friction elements 26 such as strips of felt or the like, to engage the reel hub.

The mechanism as so far described, is assembled on a reel in the manner best shown in Figures 1 and 4. To assemble the mechanism on the reel the bolt 16 is removed and the guide member with the weights fitting therein in the position illustrated in Figure 4, is placed on the handle so that the arms of the bar 15 extend through the cut out portions of the flanges 19. When the guide member is so placed on the reel the loops 25 will cross each other and will loop over the hub 14 as seen in Figure 3. When the bolt 16 is replaced the assembly is completed.

In casting with the reel as the spool speed increases the weights 23 tend to fly out and draw the friction elements 26 against opposite sides of the hub 14 to create a friction drag on the spool. The friction will be proportional to the reel speed so that the spool will be braked during the high speed rotation thereof when back lash is most apt to occur to maintain a slight tension on the line sufficient to prevent back lash. When the spool is turning at low speed the braking effect is proportionally reduced so that the length of the cast is not interfered with. It will be seen that because the handle fits into the cut out portions of the flanges 19 the guide member and weights must turn with the handle and can be secured thereon by a single central fastening which also serves to hold the handle on its shaft.

In cases where increased braking effect is desired and particularly where it is desirable to have some degree of braking at relatively low speeds, springs 27 acting on the weights may be provided. As shown, the weights may be cut out in their central portions to receive the springs 27 and when the weights are assembled on a reel the inner ends of the springs will bear against the sides of the handle 15 and will urge the weights outward. By selecting springs of the desired strength, any desired amount of initial braking effect can be provided which will be increased by centrifugal force on the weights during the high speed portion of a cast.

While one embodiment of the invention has been shown and described in detail, it will be understood that this is illustrative only and is not to be taken as the scope of the invention, reference being had for this purpose to the appended claims.

What is claimed is:

1. A braking mechanism for use with a fishing reel having a radially extending handle supported on a shaft and a stationary circular hub surrounding the shaft, said mechanism comprising a channel shaped guide member having its side flanges cut away centrally of its length to fit over the handle for rotation of the guide member with the handle, weights slidably mounted in the guide member on opposite sides of the handle, and flexible braking loops respectively secured at their ends to the weights extending inward therefrom and cross looped over the hub.

2. A braking mechanism for use with a fishing reel having a radially extending handle supported on a shaft and a stationary circular hub surrounding the shaft, said mechanism comprising a channel shaped guide member having its side flanges cut away centrally of its length to fit over the handle for rotation of the guide member with the handle, weights slidably mounted in the guide member on opposite sides of the handle, flexible braking loops respectively secured at their ends to the weights extending inward therefrom and cross looped over the hub, and friction material carried by the central parts of the loops to engage the hub when the weights move out in response to centrifugal force.

3. The construction of claim 2 including springs engageable with the handle and acting on the weights to urge them outward.

4. The construction of claim 1 in which the web of the guide member is pressed inward of the channel shape to engage the outer surface of the handle.

References Cited in the file of this patent

UNITED STATES PATENTS

| | | |
|---|---|---|
| 685,039 | Foote | Oct. 22, 1901 |
| 1,151,907 | Sime | Aug. 31, 1915 |
| 1,570,265 | Lebbink | Jan. 19, 1926 |
| 2,345,471 | Goff et al. | Mar. 28, 1944 |
| 2,560,678 | Wirt | July 17, 1951 |
| 2,597,486 | Hockney | May 20, 1952 |

FOREIGN PATENTS

| | | |
|---|---|---|
| 383,387 | France | Jan. 7, 1908 |